(12) United States Patent
Buckley et al.

(10) Patent No.: US 6,568,151 B2
(45) Date of Patent: May 27, 2003

(54) CONVEYOR FOR USE IN CONTAMINATION SENSITIVE EQUIPMENT

(75) Inventors: David Buckley, Hudson (CA); Max Yablonovitch, Dollard-des-Ormeaux (CA)

(73) Assignee: Kalish, Inc., Kirkland (CA)

( * ) Notice: Subject to any disclaimer, the term of this patent is extended or adjusted under 35 U.S.C. 154(b) by 114 days.

(21) Appl. No.: 09/778,541

(22) Filed: Feb. 7, 2001

(65) Prior Publication Data

US 2002/0104741 A1 Aug. 8, 2002

(51) Int. Cl.[7] ............................................. B65B 57/20
(52) U.S. Cl. ............................ 53/240; 53/250; 53/249; 53/475; 53/900; 198/803.14
(58) Field of Search ........................... 198/383, 397.06, 198/803.14; 53/475, 240, 249, 250, 900; 414/675

(56) References Cited

U.S. PATENT DOCUMENTS

| | | | |
|---|---|---|---|
| 3,925,960 A | * 12/1975 | Saari et al. | ..................... 53/78 |
| 4,672,892 A | * 6/1987 | Ackley | ........................ 198/397 |
| 4,677,283 A | * 6/1987 | Lewis | ......................... 198/383 |
| 5,081,822 A | * 1/1992 | Boyd et al. | .................... 53/468 |
| 5,191,741 A | 3/1993 | Jones | |
| 5,463,839 A | * 11/1995 | Stange et al. | ................... 53/54 |
| 5,522,512 A | * 6/1996 | Archer et al. | ................ 209/580 |
| 5,829,632 A | * 11/1998 | Gehlert et al. | .............. 221/264 |
| 5,966,910 A | * 10/1999 | Ribani et al. | ................. 53/560 |
| 6,185,901 B1 | * 2/2001 | Aylward | ....................... 53/250 |
| 6,269,612 B1 | * 8/2001 | Aylward | ....................... 53/473 |

* cited by examiner

Primary Examiner—Douglas Hess
(74) Attorney, Agent, or Firm—Blackwell Sanders Peper Martin LLP

(57) ABSTRACT

The present invention relates to a disposable conveyor for use with an apparatus handling contamination-sensitive discrete items. The conveyor has at least one cavity, each cavity capable to carry at least one discrete item. The conveyor is adapted to be mounted on the contamination-sensitive apparatus that, in operation, is capable to impart movement to the conveyor for displacing the conveyor, and its cavities, along a predetermined path. The present invention also relates to a method for transporting discrete items in a machine performing production runs with different types of contamination-sensitive discrete items. The method involves installing a conveyor as described above on the machine and using it to perform a first production run with a first type of discrete items. The conveyor is then disposed of and a new conveyor installed on the machine, used to perform a second production run with a second type of discrete items, different from the first type.

23 Claims, 5 Drawing Sheets

CONVEYOR FOR USE IN CONTAMINATION SENSITIVE EQUIPMENT

FIELD OF THE INVENTION

The present invention relates to the field of contamination sensitive equipment, such as a tablet dispenser. More particularly, the present invention is directed to a novel conveyor for transporting contamination sensitive material.

BACKGROUND OF THE INVENTION

In all aspects of the pharmaceutical trade, product safety issues are of paramount importance. From the raw materials to the final container sitting on the druggist's shelf, the product undergoes countless checks to ensure that what is in the pill bottle has been, among other things, correctly manufactured and properly labelled. Given the nature of a pharmaceutical product, it is critical to ensure that any possible contamination of the product is prevented throughout the manufacturing and packaging process, as product cross-contamination may pose a serious threat to public health and safety.

Accordingly, an important requirement for pharmaceutical production systems is that they be implemented in clean rooms in which the air circulation is carefully controlled and heavily filtered. The expense associated with air handling in these clean rooms is extremely high, and increases with the size of the room. The larger the machines in use by the pharmaceutical production system, the larger the clean room and related costs will be.

Tablet packaging machines are used in the pharmaceutical industry to fill bottles with pharmaceutical tablets or pills, and are one example of equipment that must handle various types of contamination-sensitive material. Traditionally, both the vibratory-type tablet dispenser and the slat-type tablet dispenser have been used within pharmaceutical production systems to fill bottles with tablets. Although functional, both types of machines can be improved on, in particular with respect to the size of the machine, the speed of operation of the machine and the degree of maintenance required in order to prevent possible contamination of the pharmaceutical products being processed by the machine.

In the case of the slat-type tablet dispenser, typically the faster of the two machines, slats of different types are connected in a continuous chain that forms a conveyor for transporting and processing tablets. Each different type of slat performs a different function within the chain of slats, where examples of the different types of slats include test slats, time-wasting slats and slats with cavities for receiving and carrying the tablets The different slats are connected to each other according to a particular order, type and quantity in order to ensure that the tablets are correctly and safely processed. During different tablet packaging operations, a particular chain of slats may be re-used to carry tablets of different chemical compositions that share a similar size and shape, and thus require a similar cavity geometry. In order to prevent cross-product contamination, the slats must be meticulously washed and cleaned before switching from one tablet packaging operation to another. Unfortunately, the washing or a chain of slats may take several hours to complete, reducing the productivity of the tablet packaging machine. Further, oven when the slats have been carefully washed, the possibility of cross-contamination may remain.

The background information provided above clearly indicates that there exists a need in the industry to provide an improved apparatus and method for handling, transporting and packaging contamination sensitive material, such as pharmaceutical tablets.

SUMMARY OF THE INVENTION

The present invention provides in one aspect a disposable conveyor for use with an, apparatus handling contamination-sensitive discrete items. The conveyor defines a support surface having at least one cavity, each cavity capable to carry at least one discrete item. The conveyor is adapted to be mounted on the contamination-sensitive apparatus that, in operation, is capable to impart movement to the conveyor for displacing the support surface along a predetermined path. The predetermined path includes an inflection area, at least a section of the conveyor including a continuous sheet of material that possesses sufficient flexibility to bead et this inflection area. When a cavity in the support surface passes over the inflection area during displacement of the support surface along the predetermined path, the cavity releases any discrete items contained therein.

Advantageously, the conveyor as described above is relatively easy to manufacture and, if desired, to maintain, all at a very low cost. Above all, the conveyor is economically disposable. This is particularly beneficial in the pharmaceutical industry where equipment may be required to sequentially handle several different types of pharmaceutical products and any cross-contamination of these pharmaceutical products must be avoided at all costs.

In the present specification, the expression "conveyor" encompasses a broad category of apparatuses for moving articles, discrete items and/or materials from place to place.

In a particular, non-limiting example of implementation, a tablet dispenser is operative to fill containers with tablets. The tablet dispenser includes a tablet bin for retaining tablets, a container filling station for directing tablets to containers and a conveyor having cavities. A drive unit imparts movement to the conveyor for displacing the conveyor along a predetermined path. The cavities in the conveyor are filled with tablets as the conveyor moves under the tablet bin, the conveyor transporting tablets in its cavities from the tablet bin to a tablet releasing station at which tablets are released from the cavities to the container filling station.

Specific to the present invention, the conveyor of the tablet dispenser is a disposable, continuous loop (also referred to as a belt) of flexible material, such as plastic. Cavities are formed integrally in the flexible material of the belt, for example through a well-known plastic vacuum forming process. The belt is mounted on first and second belt rollers of the tablet dispenser, and is driven by the drive unit along a continuous loop path defined around the belt rollers. In operation, tablets released from the tablet bin fall into cavities of the belt, which transports these tablets to the tablet releasing station that is implemented by the first belt roller. As the belt moves over the inflection area defined by the first belt roller, any tablets contained in the cavities of the belt fall out of the cavities. A plurality of chutes adjacent the first belt roller implement the container filling station, receiving the tablets released from the cavities of the belt at the tablet releasing station and directing them to containers.

In a specific example, the conveyor includes an identifier that uniquely identifies the conveyor. This identifier may include reference data characterising the conveyor for a particular operation to be performed by the apparatus handling contamination-sensitive discrete items, where this reference data may be used to validate the conveyor prior to its use by the apparatus. The identifier may also include position data for uniquely identifying the conveyor cavities, such that monitoring of the cavities and their contents would be possible. The identifier may be implemented as one or more machine-readable bar codes, printed on or etched into the material of the conveyor. Alternatively, the identifier could be implemented as a machine-readable magnetic tag or strip bonded to the conveyor. In yet another alternative, the identifier could be implemented by operator-readable data printed on the conveyor, among other possible implementations.

In another broad aspect, the invention provides an apparatus for transporting discrete items. The apparatus includes a holding station, a disposable conveyor and a drive unit. The holding station retains a plurality of discrete items, and is capable to release these discrete items to the conveyor. The conveyor includes a plurality of cavities, each cavity capable to carry at least one discrete item, while the drive unit is operative to impart movement to the conveyor for displacing the conveyor along a predetermined path. As the conveyor moves beneath the holding station, its cavities are filled with discrete items, the conveyor being operative to transport discrete items in its cavities along the predetermined path.

According to yet another broad aspect, the present invention provides a method for transporting discrete items in a machine performing production runs with different types of contamination-sensitive discrete items.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DETAILED DESCRIPTION

Figure 1:
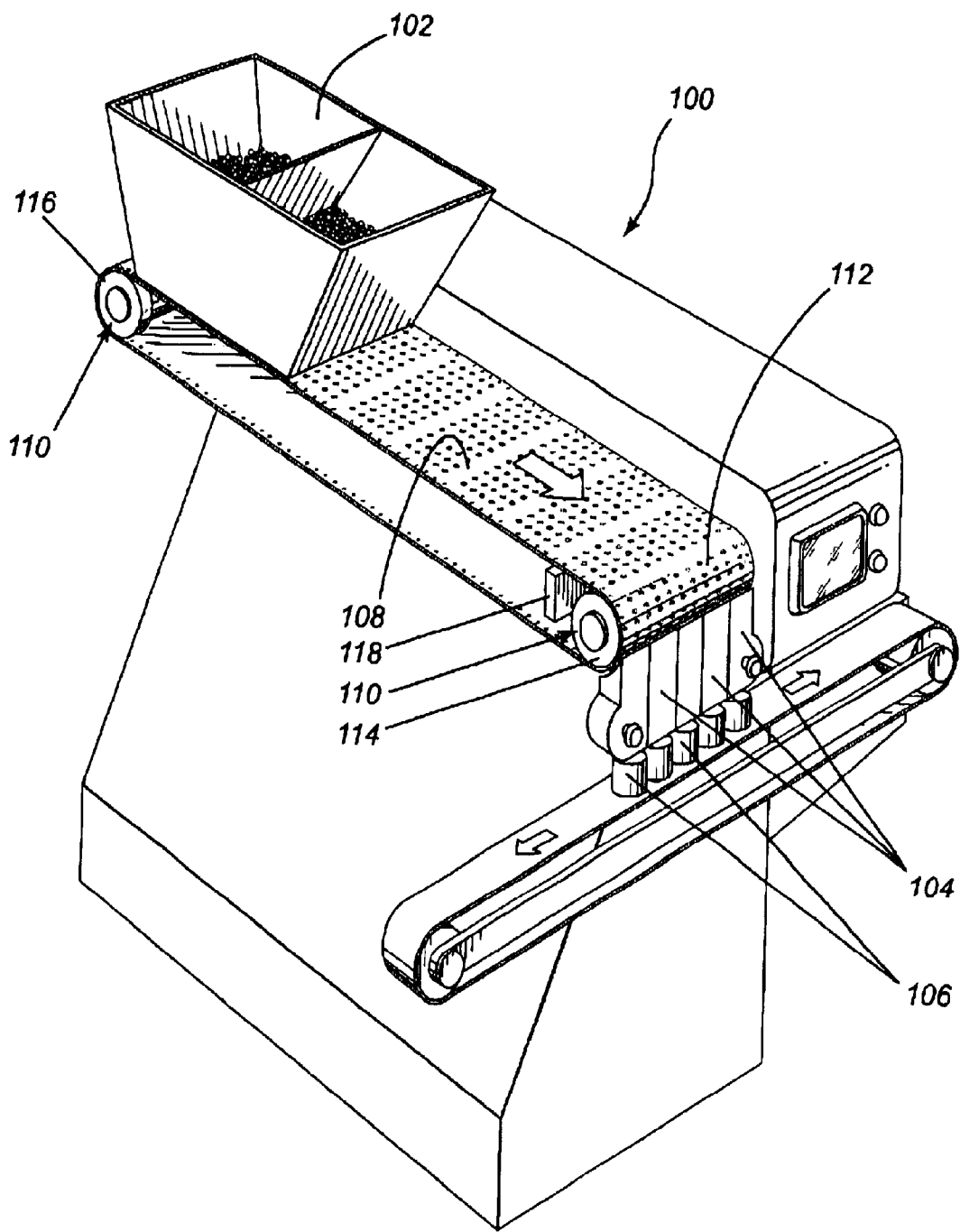
FIG. 1 is a perspective view of a tablet dispenser, in accordance with an example of implementation of the present invention.

FIG. 1 illustrates a tablet packaging machine, notably a tablet dispenser 100, in accordance with an example of implementation of the present invention. Such a tablet dispenser 100 may be used in the pharmaceutical industry to fill containers with tablets. The tablet dispenser 100 includes a tablet bin 102, a container filling station 104 and a conveyor 108. A drive unit 110 imparts movement to the conveyor 108 for displacing the conveyor 108 along a predetermined path. The tablet bin 102 implements a holding station for holding a quantity of tablets, and may be referred to in the pharmaceutical industry as a hopper. In operation, the conveyor 108 forms a moving bed that passes beneath the tablet bin 102 and receives tablets therefrom, the tablet bin 102 including a discharge aperture (not shown) for releasing tablets to the conveyor 108. The conveyor 108 transports tablets from the tablet bin 102 to a tablet releasing station 112 where tablets are released from the conveyor 108 to the container filling station 104. At the container filling station 104, the tablets are directed to containers 106.

A typical example of an operation performed by the tablet dispenser 100 is filling 100 count bottles of 250 mg Aspirin (trade-mark), where the tablet dispenser 100 is capable to fill, for example, 10 bottles at one time.

Note that the discharge aperture of the tablet bin 102 may be sealed such that no tablets are released from the tablet bin 102. In particular, the size of the discharge aperture may be adjustable, varying between a fully closed position (in which no tablets are released from the tablet bin 102) and a fully open position (in which a maximum amount of tablets are released from the tablet bin 102 at one time). Since this feature of the tablet bin 102 is not critical to the present invention, it will not be described in further detail.

The tablet bin 102 and/or the conveyor 108 may be adjustably tiltable on the tablet dispenser 100, such that the tablets released from the discharge aperture of the tablet bin 102 fall into the cavities of the conveyor 108 underneath at a particular loading angle. This loading angle may facilitate loading of the tablets from the tablet bin 102 into the cavities of the conveyor 108, such that the rate at which the cavities of the conveyor 108 are successfully filled with tablets is increased. This may be especially beneficial in the case of tablets characterized by a particular size and shape.

The above structural, description of a tablet dispenser 100 has the purpose of presenting certain components of such a machine, and is in no way intended to limit the scope of the present invention to just these components.

Figure 2:
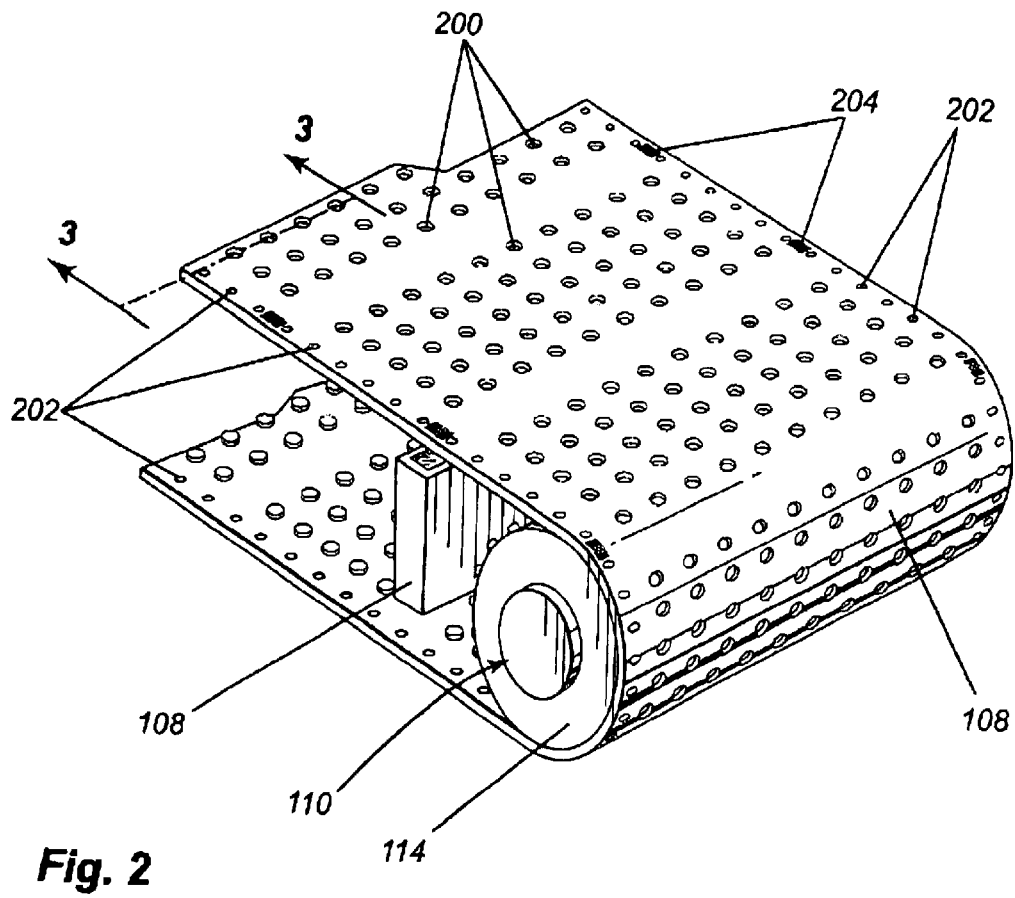
FIG. 2 is a perspective view of the conveyor used by the tablet dispenser shown in FIG. 1.
Figure 3:
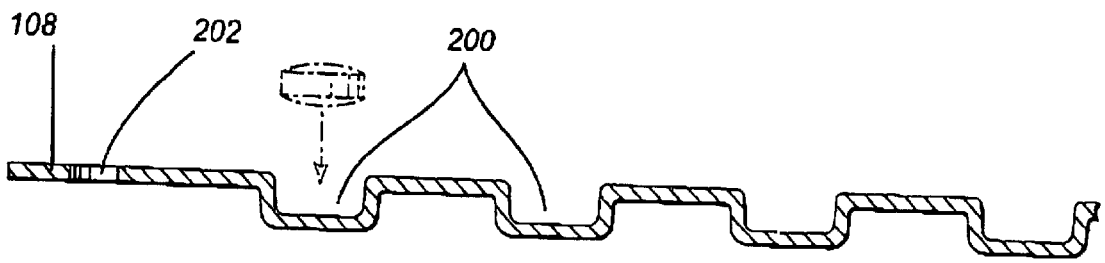
FIG. 3 is a cross-sectional view of the conveyor, taken along line 3—3 of FIG. 2.

Specific to the present invention, the conveyor 108 of the tablet dispenser 100 is a disposable, continuous loop (also referred to as a belt) of flexible material, in this example plastic. As shown in FIG. 2 and in cross-section in FIG. 3, cavities 200 are formed integrally in the flexible material of the conveyor 108, in this example through a plastic vacuum forming process that is well known to those skilled in the art. The conveyor 308 thus forms a support surface for the cavities 200. In the example shown in FIG. 2, the conveyor 108 includes a predetermined number of cavities 200, where these cavities 200 are arranged in rows and columns, and define cavity groupings. The cavities 200 of the conveyor 108 all share a substantially identical geometry, each cavity 200 being of such a size and shape as to be able to carry one of the tablets retained in the tablet bin 102. Many different arrangements and configurations of cavities are possible and are included in the scope of the present invention. Note that the cavities 200 of different conveyors 108 may be characterized by different cavity geometries, for accommodating tablets of different sizes and shapes. Further, the cavities 200 may be designed to carry multiple tablets simultaneously.

The drive unit 110 includes front and rear belt rollers 114 and 116, respectively, on which the conveyor 108 is mounted, where the front belt roller 114 is motorized while the rear belt roller 116 is idle. The conveyor 108 includes drive holes 202 along its edges, as shown in FIG. 2, which engage the front and rear belt rollers 111, 116. Thus, upon motor-controlled rotation of the font belt roller 114, movement is imparted to the conveyor 108 by means of the drive holes 202, for driving the conveyor 108 along a continuous loop path defined around the belt rollers 114 and 116. Since the rear belt roller 116 is idle, it automatically follows the rotation of the front belt roller 114, as a result of the movement of the conveyor 108. Note that, in an alternative implementation, both belt rollers 114 and 116 could be motorized.

The tablet dispenser 100 is designed such that conveyor belts 108 can be loaded onto and unloaded from the tablet dispenser 100 by an operator of the tablet dispenser 100. In this particular example, the rear belt roller 116 is mounted to the tablet dispenser 100 by means of a pneumatically actuated slide with automatic tension adjustment. Accordingly, the rear belt roller 116 can be displaced in the direction of the front belt roller 114 such that a conveyor belt 108 can be either removed from or mounted to the tablet dispenser 100. The automatic tension adjustment ensures that, once the conveyor belt 108 has been installed on the tablet dispenser 100, the rear belt roller 116 moves away from the front belt roller 114 towards a rest position, automatically adjusted for creating and maintaining the appropriate amount of tension in the newly mounted conveyor belt 108. Various implementations and methods for installation and removal of the conveyor belt 108 are possible and are included in the scope of the present invention.

The continuous loop path followed by the conveyor 108 includes two inflection areas, both defined by the belt rollers 114, 116, at which the loop path curves and bends. The material of the conveyor 108 possesses sufficient flexibility to bond at these inflection areas, such that the conveyor 108 can be mounted on the bell rollers 114, 116 and follow the loop path during movement.

The belt roller 114 implements a tablet releasing station 112, where tablets contained in the cavities 200 of the conveyor 108 are released from the conveyor 108 to the container filling station 104. In this example, the container filling station 104 includes a plurality of chutes adjacent the belt roller 114 that receive the tablets released from the cavities 200 of the conveyor 108 at the tablet releasing station 112 and feed them to a row of containers 106.

In operation, as a row A of cavities 200 in the conveyor belt 108 passes beneath the discharge aperture of the tablet bin 102, a tablet is permitted to drop into each cavity 200, until all the cavities 200 in the row A are filled. As the conveyor 108 is displaced by the rotation of the belt rollers 114, 116, the row A of cavities moves along the loop path, thus transporting the tablets contained therein from the tablet bin 102 towards the tablet releasing station 112. As the row A in the conveyor 108 moves over and around the inflection area defined by the belt roller 114, the tablets contained in the cavities 200 of the row A fall out of the cavities 200. The tablets then fall through the chutes of the container filling station 104, whereby the tablets are collated and fed into containers 106. As the conveyor continues to move along the loop path, the row A of now empty cavities will eventually move over and around the belt roller 116, after which it will pass under the tablet bin 102 for receiving more tablets.

Note that, in a variant example of implementation, the belt roller 114 of the tablet dispenser 100 may be designed to vibrate during rotation, thus facilitating and encouraging the release of tablets from cavities 200 moving over the belt roller 114.

In other possible variations, the continuous conveyor belt 108 may include ribbed channels for strengthening the material of the belt 108. In a specific example, these channels may take the form of ridges formed in the material of the belt 108, in either the column or row direction of the cavities 200. The conveyor belt 108 may also include positioning members along both sides of the conveyor belt 108, for engaging the belt rollers 114, 116 and centering the conveyor belt 108 on the belt rollers 114, 116. In a specific example, these positioning members are implemented by continuous side edges running along both sides of the conveyor belt 108. These side edges may be formed by folding over the material of the conveyor belt 108 along both sides of the belt 108, such that the side edges extend substantially perpendicularly to the cavity support surface defined by the conveyor belt 108.

In the specific example of implementation shown in FIG. 1, the tablet dispenser 100 includes an inspection unit 118 that is operative to monitor the contents of the cavities 200, both before and after passing through the tablet releasing station 112. The inspection unit 118 includes two sensor devices, notably a first sensor device for detecting the absence of a tablet in a cavity and a second sensor device for detecting the presence of a tablet in a cavity. The first sensor device monitors the rows of cavities 200 as they arrive at the tablet releasing station 104, for detecting any empty cavity 200. The second sensor device monitors the rows of cavities 200 as they leave the tablet releasing station 104, for detecting any full cavity 200 (i.e. cavity in which a tablet is stuck). Thus, the inspection unit 118 is capable to verify the number of tablets directed to each container 106 and to monitor the filling of the containers 106. When a tablet remains stuck in the cavity 200 of the conveyor 108 instead of being released therefrom, the inspection unit 118 generates a control signal indicative of an improperly filled container 106 and will transmit this signal to the operator of the tablet dispenser 100. This control signal may take the form of an audio signal or a visual signal, among other examples.

In this example, the plastic material of the conveyor belt 108 is transparent, permitting through-view inspection of the contents of the cavities 200 by the sensor devices of the inspection unit 118. Accordingly, the first and second sensor devices may be implemented by vision system phototransistors, scanners, or other such optical devices. Note that different types of conveyor material/sensor technology combinations exist, where the sensor technology is compatible with and able to penetrate the material of the conveyor 108 for inspecting the contents of the cavities 200. These alternative types of conveyor material/sensor technology combinations are included in the scope of the present invention.

The conveyor 108 optionally includes an identifier that is uniquely associated with and identifies the conveyor 108, such as a serial number. The identifer may include reference data characterising the conveyor 108 for a particular operation to be performed by the tablet dispenser 100, where this reference data may be used to validate the conveyor 108 prior to its use by the tablet dispenser 100. The identifier may also include position data for uniquely identifying the cavities 200 and/or the cavity groupings of the conveyor 108, such that precise monitoring of the cavities 200 would be possible.

In a specific example, the identifier consists of a plurality of machine-readable bar codes 204 printed on the plastic material of the conveyor belt 108 along one side of the conveyor 108, as shown in FIG. 2. Each bar code 204 is associated with a particular cavity grouping, and may include identification, position and/or validation information characterising one or both of the conveyor 108 and the particular cavity grouping. These bar codes 204 are printed on the material of the conveyor 108 during manufacturing of the conveyor 108. Alternatively, the bar codes 204 may be laser etched into the material of the conveyor 108. The tablet dispenser 100 includes a reader (not shown) operative to read the information stored in the bar codes 204 once the conveyor belt 108 has been installed on the tablet dispenser 100. Note that the identifier may include any number of bar codes 204 printed on the conveyor 108, including only one.

Alternatively, the identifier may be a machine-readable magnetic tag or strip bonded to the plastic material of the conveyor belt 108. In the case of a magnetic strip, the strip may be bonded to the conveyor belt 108 along one side of the belt. The identifier may also be implemented by one or more RF tags attached to the conveyor belt 108, as well as by operator-readable data printed on the conveyor 108, among many other possible implementations.

In a different, non-limiting example of implementation, the conveyor 108 is a continuous sheet of flexible material that does not loop around to form a continuous belt. Rather, the belt roller 116 is a supply reel while the belt roller 114 is take-up reel, the sheet of flexible material extending from the supply reel 116 to the take-up reel 114. After the sheet of flexible material comes off of the supply reel 116, it passes underneath the tablet bin 102, such that cavities 200 in the material, are filled with tablets. As the sleet of flexible material is fed onto the take-up reel 114, cavities in the material move over the take-up reel 114 and release any tablets contained therein to the container filling station 104 which is located adjacent the take-up reel 114. In this example, each cavity in the conveyor 108 is only used once to transport a tablet from the tablet bin 102 to the container filling station 104.

In another alternative example of implementation, the tablet dispenser 100 includes a single, drum-like cylindrical belt roller that is motorized. The tablet bin 102 is located above the belt roller, while the container filling 104 station is located below and adjacent the belt roller. The continuous loop conveyor belt 108 is mounted onto the belt roller and, upon rotation of the belt roller, moves with the belt roller along a circular path defined by the circumference of the circular cross-section of the belt roller. As a row B of cavities 200 in the conveyor 108 passes under the tablet bin 102, the cavities 200 of row B are filled with tablets. Given that the belt roller is continuously rotating, the row B of cavities 200 will move with the belt roller and traverse the inflection area defined by the belt roller, which implements the tablet releasing station. As the cavities 200 in row B move around the belt roller, the tablets contained in the cavities 200 of row B will fall out of the cavities 200. The tablets released from the conveyor 108 at the tablet releasing station are received by the container filling station 104.

Figure 6:
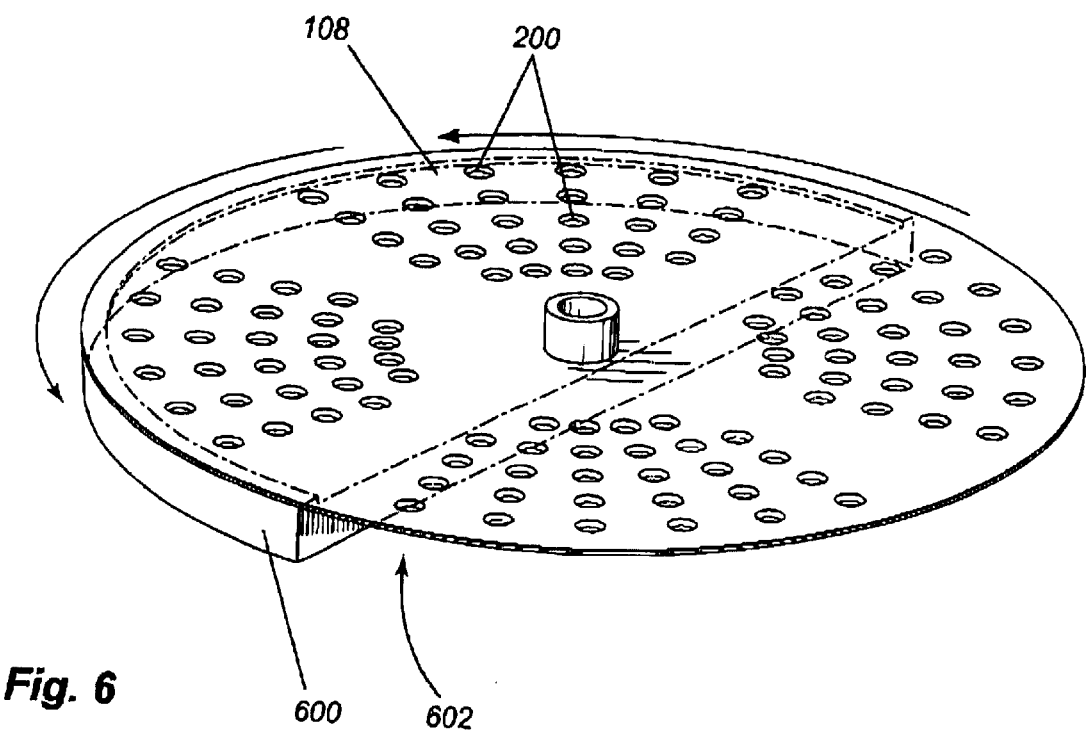
FIGS. 6 and 6a illustrate a perspective view of the conveyor mounted to a tablet dispenser, in accordance with an alternative example of implementation of the present invention.
Figure 6A:
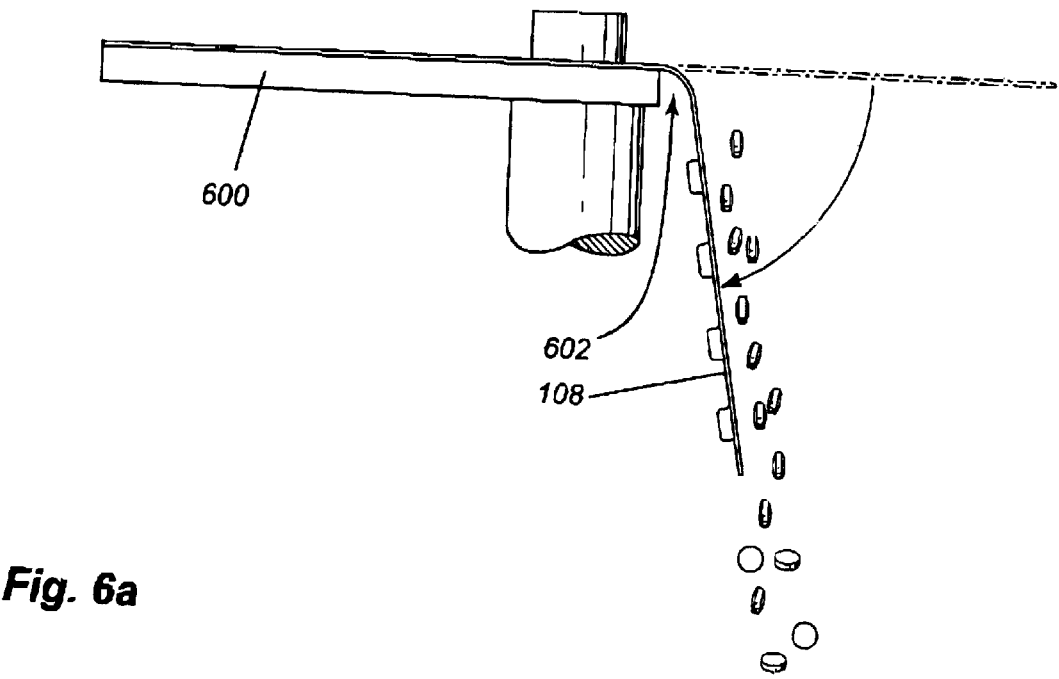

In yet another example of implementation, the conveyor 108 is a disk of flexible material, such as plastic, as shown in FIGS. 6 and 6a. In this example, the tablet dispenser has a disk-shaped support surface 600 matching the dimensions of the conveyor 108. The conveyor 108 is mounted onto the support surface 600 by means of a drive shaft, the drive shaft being operative to impart movement to the conveyor 108 for rotating the conveyor 108 on the support surface 600. The support surface 600 of the tablet dispenser has a cut-out portion 602 whereby, as a section of the conveyor 108 passes over the cut-out portion 602, the flexible material of the conveyor 108 allows the conveyor section to bend such that it dips down into the cut-out portion 602. As the conveyor section dips down into the cut-out portion 602, the cavities of the conveyor section release any tablets contained therein to the adjacent container filling station.

One of the advantages of the conveyor 108 of the present invention is the fact that it is disposable. No matter the shape or configuration of the conveyor 108, once the tablet dispenser 100 has completed a production run with a conveyor 108 using a particular type of tablet, the conveyor 108 can be disposed of and a new conveyor 108 installed thereon. The tablet dispenser 100 is then ready to perform another production run using a different type of tablet. Thus, contamination between the two types of tablets is avoided, and the down-tine for the tablet dispenser 100 between production runs is extremely brief.

Figure 4:
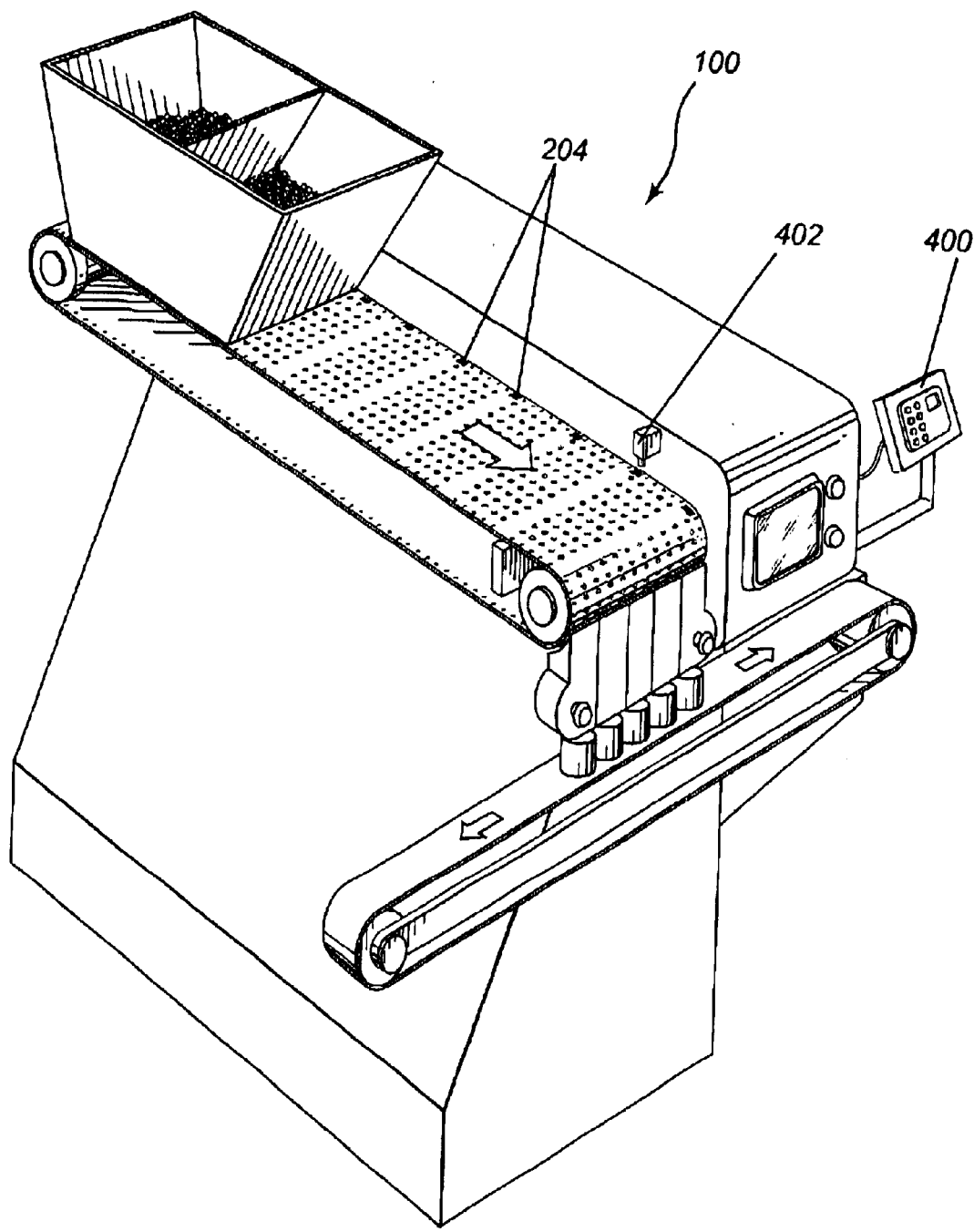
FIG. 4 is a perspective view of the tablet dispenser with validation system, in accordance with an example of implementation of the present invention.

In a variant, the tablet dispenser 100 may include a validation system, the latter including an operator workstation 400 and a reader 402 as shown in FIG. 4. This validation system is operative to validate the conveyor 108. In particular, the validation system detects human errors that may have affected the installation of the proper conveyor 108 onto the tablet dispenser 100, where an improper installation may give rise to a risk of cross-contamination and/or to an incorrect quantity of tablets dispensed.

Figure 5:
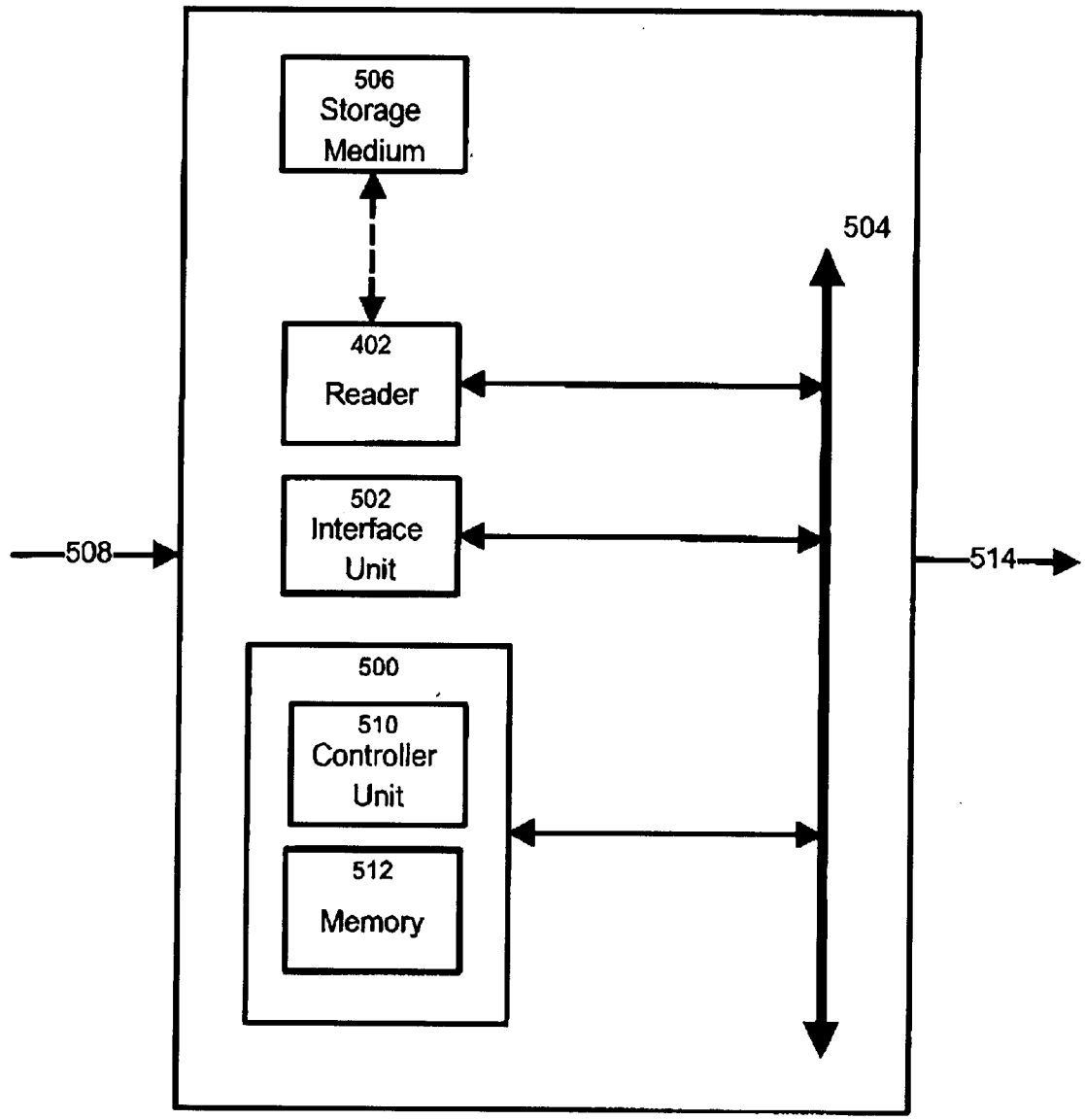
FIG. 5 is a block diagram of an example of a validation system for the tablet dispenser shown in FIG. 4.

A functional block diagram of an example of such a validation system is depicted in FIG. 5. In this non-limiting example of implementation, the system includes the reader 402 (shown in FIG. 4), a validation unit 500, an interface unit 502, a system bus 504 and a machine-readable storage medium 506. The system bus 504 allows for the exchange of data and control signals between the various components of the validation system.

At input 508, the validation system receives input signals indicative of a particular process to be performed by the tablet dispenser 100. These input signals are in the form of user instructions that are retrieved from an operator via a user interface generated by the interface unit 502. Under this specific example of implementation, the interface unit 502 creates a data capture dialog box or screen on the display of the workstation 400 where the operator is required to enter instructions specifying the particular process to be performed by the tablet dispenser 100. As discussed above, such a process may be to fill 100 count bottles with 250 mg Aspirin tablets. The interface unit 502 is software implemented on a computing device, such as the workstation 400.

The storage medium 506 stores reference data characterizing the tablet dispenser 100 for the particular process to be performed by the tablet dispenser 100. The machine-readable storage medium 506 is implemented by the identifier of the conveyor 108, in this example the bar codes 204 embedded in the conveyor 108.

The reader 402 is operative to read and download the data stored in the bar codes 204 to the validation unit 500. In this example of implementation, the reader 402 is implemented in hardware, and is designed to interact with the bar codes 204 in order to read the information contained therein and to transmit this information to the validation unit 500. The functionality and structure of such a reader 402 are well known to those skilled in the art, and accordingly will not be described in further detail. Note that alternative types and designs of reader/identifier combinations may be used, without departing from the scope of the present invention.

The validation unit 500 includes a controller unit 510 and a memory 512. The memory 512 contains a program element comprised of individual instructions that are executed by the controller unit 510 that is in the form of a Central Processing Unit (CPU). Upon execution, the program element controls the operation of the validation unit 500. In addition, the memory 512 provides random access storage, capable of holding data elements that the controller unit 510 manipulates during the execution of the program.

According to this example of implementation, the validation unit 500 is software implemented on a computing platform, such as the workstation 400. As described above, the validation unit 500 is implemented by a program element that is stored in the memory 512, and executed by the controller 510, of the computing device. Alternatively, the validation system may be stored on a computer readable medium, such as a floppy disk, that is external to the computing device. The floppy disk can be read by a floppy drive to load the program instructions in the memory 512. The computer readable medium may be part of a remote computing platform that is in some way connected to the computing platform that executes the program element for allowing the data transfer necessary to pass the program element to the computing platform on which the execution will take place. For example, a file server containing the program element that can be accessed over any suitable connection by another computing platform to obtain the program element is considered a computer readable medium storing the program element.

Note that in an alternative example of implementation, the validation unit 500 may be implemented, either entirely or in part, by the reader 402, itself including a computing platform having a CPU and a memory. The reader 402 may also implement the interface unit 502, where each unit is associated with a separate program element, the various program elements being run simultaneously by the CPU of the reader 402.

The execution of the program element stored in the memory 512 implements, in large part, the validation mechanism performed by the validation system. In operation, once the instructions indicative of a particular process to be performed by the tablet dispenser 100 have been received by the validation system, and a conveyor 108 has been installed by an operator on the tablet dispenser 100, validation of the installed conveyor 108 commences. The tablet dispenser 100 will run the conveyor 108 around the loop path once for a complete revolution, without tablets or containers 106. Thus, the identifier of the conveyor 108, in this example the bar codes 204, will pass within proximity of the reader 402 which will read the data stored therein. If the identification and validation information stored in the bar codes 204 corresponds to the particular process to be performed by the tablet dispenser 100 as directed by the operator, the conveyor 108 will be validated and the tablet dispenser 100 cleared for running with actual tablets and containers 106. If validation of the conveyor 108 fails, the validation unit 500 will generate a control signal including a VALIDATION FAILED indication and will transmit this signal to the operator via output 514. This control signal including the validation status indication may take the form of an audio signal or, alternatively, may be displayed at the workstation 400 via the interface unit 502. The control signal may also include various error messages and suggested corrective measures for the operator.

Note that the conveyor described herein may be applied to a variety of different machines handling discrete items. In particular, the present validation system is not limited to a tablet packaging machine for filling containers with tablets, which was used simply for purposes of illustration.

The above detailed description should not be interpreted in any limiting manner as refinements and variations can be made without departing from the spirit of the invention. The scope of the invention is defined in the appended claims and their equivalents.

We claim:

1. An apparatus for filling containers with tablets, said apparatus comprising:
   a) a tablet bin retaining a plurality of tablets, said tablet bin including a discharge aperture for releasing tablets therefrom;
   b) a conveyor having a plurality of cavities, each cavity capable to carry at least one tablet, at least a section of said conveyor including a continuous sheet of flexible material, said conveyor being located adjacent said discharge aperture for receiving tablets therefrom;
   c) a drive unit operative to impart movement to said conveyor for displacing said conveyor along a predetermined path, whereby as said conveyor moves beneath said tablet bin said cavities are filled with tablets;
   d) a tablet releasing station located along said predetermined path, said conveyor being operative to transport tablets in said cavities from said tablet bin to said tablet releasing station, at said tablet releasing station said cavities releasing the tablets contained therein; and
   e) a container filling station for receiving the tablets released from said cavities at said tablet releasing station, said container filling station being operative to direct tablets to at least one container.

2. An apparatus as defined in claim 1, wherein said apparatus further includes an inspection unit for detecting the contents of said cavities as said conveyor is displaced along said predetermined path.

3. An apparatus as defined in claim 2, wherein said inspection unit is capable to verify the number of tablets directed to the at least one container by said container filling station.

4. An apparatus as defined in claim 3, wherein said inspection unit includes at least one sensor device compatible with the material of said conveyor for detecting the contents of said cavities of said conveyor.

5. An apparatus as defined in claim 1, wherein said predetermined path includes at least one inflection area, said material possessing sufficient flexibility to bend at said inflection area.

6. An apparatus as defined in claim 5, wherein said tablet releasing station includes said inflection area, whereby when said cavities pass over said inflection area during displacement of said conveyor along said predetermined path, said cavities release any tablets contained therein.

7. An apparatus as defined in claim 6, wherein a subset of cavities pass over said inflection area substantially simultaneously during displacement of said conveyor along said predetermined path.

8. An apparatus as defined in claim 6, wherein said conveyor is a continuous belt of said flexible material.

9. An apparatus as defined in claim 8, wherein said apparatus includes a belt roller defining said inflection area, said conveyor moving over the belt roller during displacement of said conveyor along said predetermined path.

10. An apparatus as defined in claim 9, wherein said apparatus includes first and second belt rollers in a spaced-apart relationship, said conveyor being mounted on the first and second belt rollers of said apparatus whereby said predetermined path is a continuous loop defined around the first and second belt rollers.

11. An apparatus as defined in claim 10, wherein said conveyor includes positioning members for centering said conveyor on said first and second belt rollers.

12. An apparatus as defined in claim 6, wherein said conveyor is a disk of said flexible material.

13. An apparatus as defined in claim 1, wherein said conveyor has a predetermined number of cavities.

14. An apparatus as defined in claim 1, wherein said conveyor includes an identifier for uniquely identifying said conveyor.

15. An apparatus as defined in claim 14, wherein said identifier includes reference data characterising said conveyor for a particular operation to be performed by said apparatus.

16. An apparatus as defined in claim 14, wherein said identifier includes position data for uniquely identifying said cavities.

17. An apparatus as defined in claim 16, wherein the cavities in said conveyor define cavity groupings, each cavity grouping having a predetermined number of cavities, said position data uniquely identifying each cavity grouping.

18. An apparatus as defined in claim 16, wherein said identifier includes at least one bar code printed on the material of said conveyor.

19. An apparatus as defined in claim 16, wherein said identifier includes at least one bar code laser etched into the material of said conveyor.

20. An apparatus as defined in claim 16, wherein said identifier includes at least one magnetic tag.

21. An apparatus as defined in claim 20, wherein said identifier is a magnetic strip.

22. An apparatus as defined in claim 14, wherein said identifier is machine-readable.

23. An apparatus as defined in claim 1, wherein said container filling station includes a plurality of chutes, each chute directing tablets released from said cavities at said tablet releasing station to at least one container.

* * * * *

UNITED STATES PATENT AND TRADEMARK OFFICE
CERTIFICATE OF CORRECTION

PATENT NO.   : 6,568,151 B2
DATED        : May 27, 2003
INVENTOR(S)  : Buckley et al.

It is certified that error appears in the above-identified patent and that said Letters Patent is hereby corrected as shown below:

Column 1,
Line 61, after the word "washing", delete "or" and insert -- of --;
Line 63, delete "oven" and replace with -- even --;

Column 2,
Line 15, delete "bead et" and replace with -- bend at --;

Column 3,
Line 20, delete "arc" and replace with -- are --;

Column 4,
Line 44, delete "308" and replace with -- 108 --;
Line 63, delete "111" and replace with -- 114 --;

Column 5,
Line 28, delete "bond" and replace with -- bend --;
Line 29, delete "bell" and replace with -- belt --;

Column 7,
Line 23, delete "sleet" and replace with -- sheet --;

Column 8,
Line 8, delete "down-tine" and replace with -- down-time --;

Signed and Sealed this

Sixteenth Day of September, 2003

JAMES E. ROGAN
*Director of the United States Patent and Trademark Office*